UNITED STATES PATENT OFFICE.

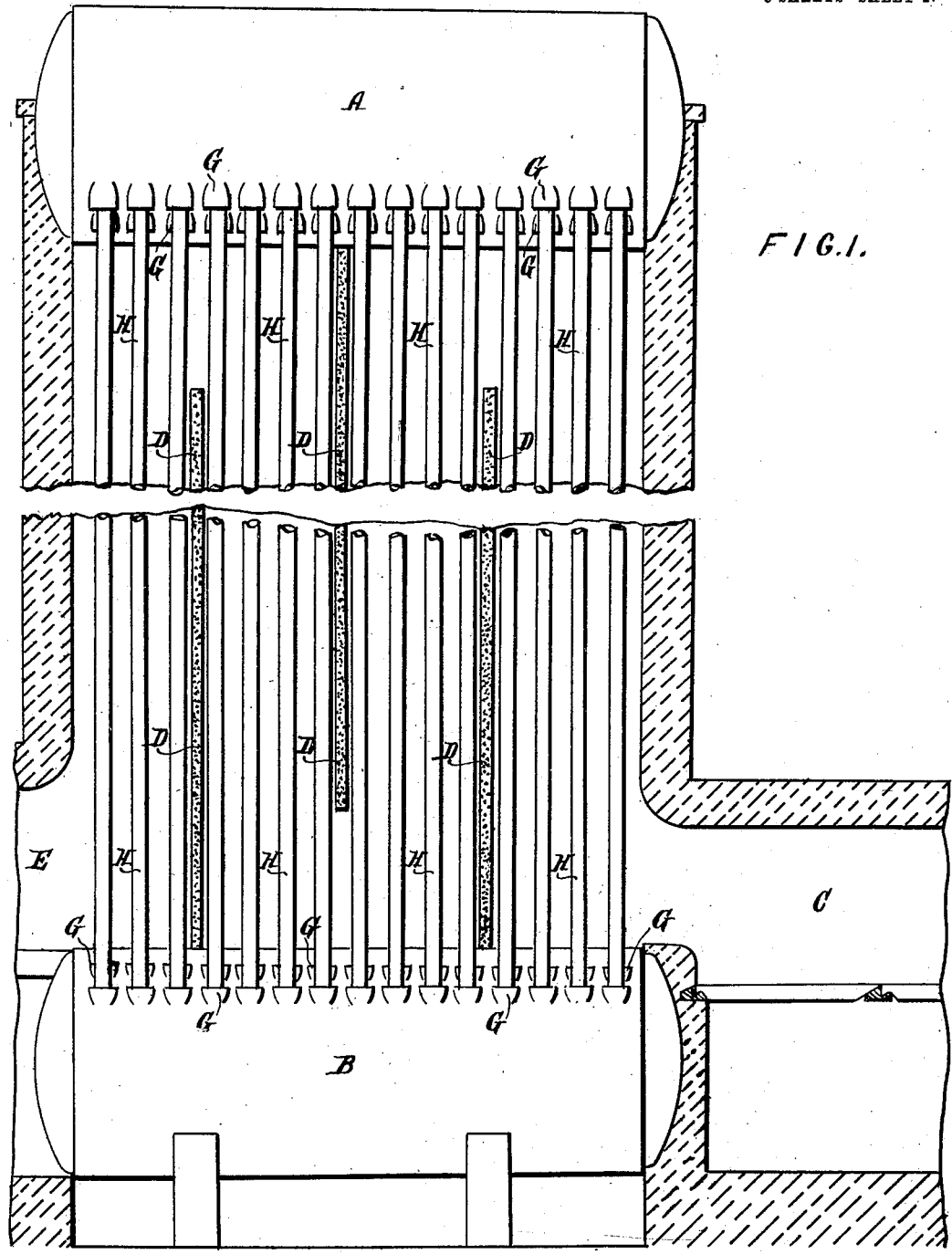

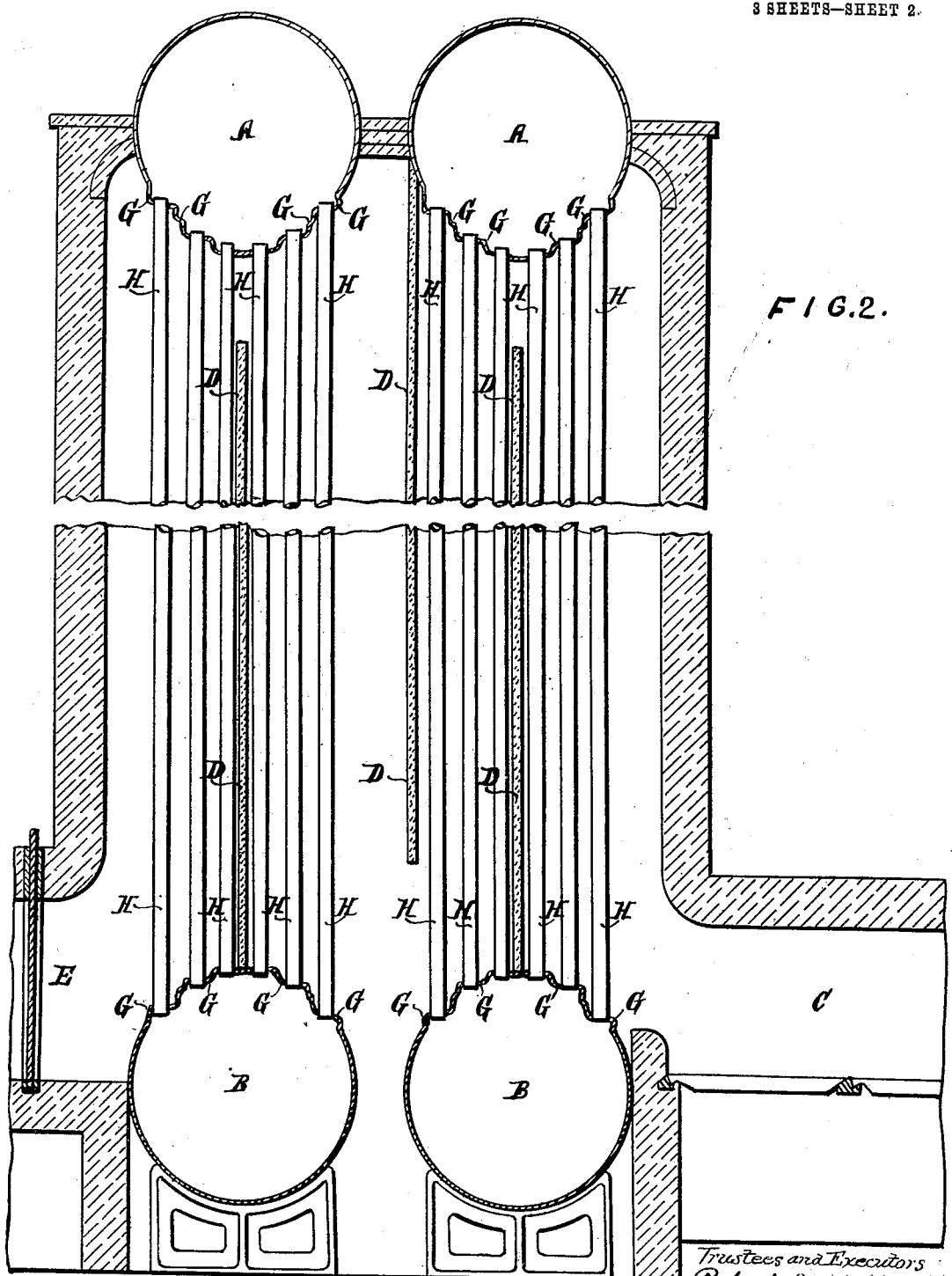

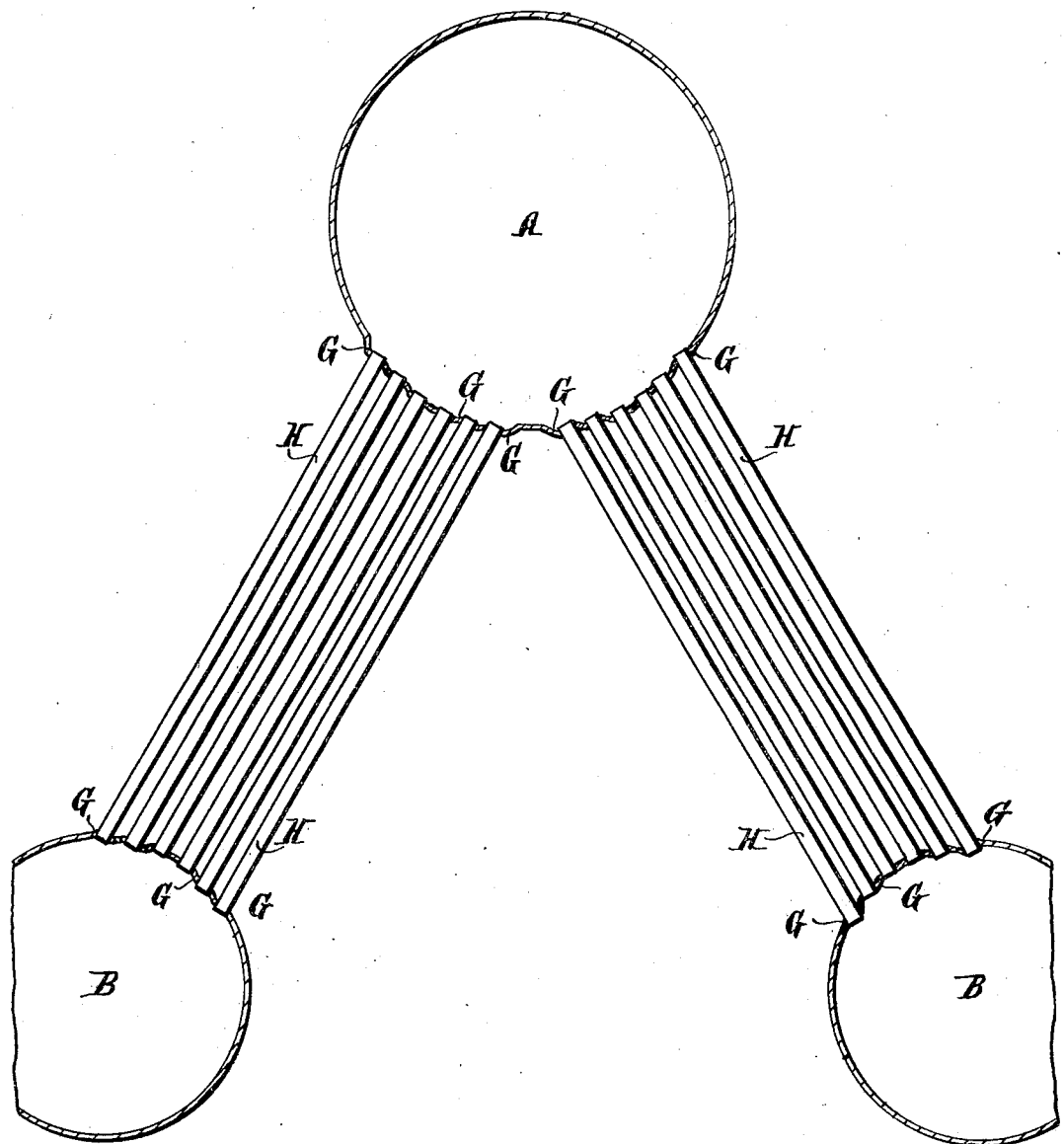

ROBERT SINCLAIR, OF EDINBURGH, ALEXANDER SINCLAIR AND GEORGE SINCLAIR, OF LEITH, AND JAMES C. SINCLAIR AND WILLIAM SINCLAIR, OF EDINBURGH, SCOTLAND, TRUSTEES AND EXECUTORS OF GEORGE SINCLAIR, DECEASED.

WATER-TUBE BOILER.

No. 856,185.  Specification of Letters Patent.  Patented June 4, 1907.

Application filed October 23, 1906. Serial No. 340,131.

*To all whom it may concern:*

Be it known that we, ROBERT SINCLAIR, engineer, a resident of Edinburgh, in the county of Mid Lothian, Scotland, ALEXANDER SINCLAIR and GEORGE SINCLAIR, boiler-makers, both residents of Leith, in the county of Mid Lothian, Scotland, and JAMES CHALMERS SINCLAIR, engineer, and WILLIAM SINCLAIR, chemist, both residents of Edinburgh, aforesaid, all of whom are subjects of the King of Great Britain and Ireland, and are trustees and executors of the late GEORGE SINCLAIR, boiler-maker, Leith, aforesaid, who did invent certain new and useful Improvements in Water-Tube Boilers, and of which the following is a specification.

The invention has for its object to improve the construction of water-tube boilers of the type having upper and lower cylindrical drums connected together by rows of straight water tubes, so that while the tubes can be readily assembled, or removed for renewal or repair without requiring headroom in the boiler house above or beyond the upper drums, the known advantages of cylindrical water drums are obtained such as that there being no portion of the drum in the form of a flat tube plate there is less liability to buckling and consequent damage to the tube fixings and the drums do not require to be internally stayed to give them the necessary strength.

In this type of water-tube boiler, as hitherto generally constructed, manhole doors or other form of openings in the drums have had to be provided to permit of the tubes being assembled and withdrawn, even though the opposing surfaces have been formed with separate landings for the ends of each tube, as with such known construction the landings are so spaced that when tubes require to be replaced they must be withdrawn and inserted through the doors, and where headroom is a desideratum this is a disadvantage as it is evident that the height of the boiler house above the upper drums must be at least the length of the tubes; or, to the same end, a portion of the opposed surfaces of the upper and lower drums have been corrugated and stepped, each step receiving the ends of one pair of a double row of tubes, there being no tubes in the space opposite the corrugation formed in the part of the surface of the cylinder between each double row of tubes so that the tubes can be inserted or withdrawn through this intervening space from the side of the boiler, also in certain known forms of fire-tube boilers, to permit of straight fire tubes being used, separate landings for the ends of each tube have been formed in one of the tube plates.

In carrying out the invention any convenient arrangement of upper and lower chambers or drums may be used, such as one, two, or more pairs of such upper and lower drums with the furnace or furnaces arranged either at the end or side of the drums; or one upper drum and two lower drums may be employed with the furnaces arranged in the space between the lower drums. The drums are connected together by rows of straight water tubes and they are of a size which permits of the ends of the tubes being expanded when in position from the interior of the drum. The opposing surfaces of the upper and lower drums have formed in them rows of separate circular landings for each water tube. The landings are parallel with each other and at right angles to the axis of the tubes. A space at least equal to the diameter of the tubes is left between each transverse row. By providing a separate landing for each tube and leaving a space between each transverse row it is possible to dispense with the necessity of forming corrugations in the drum to permit of the insertion or withdrawal from the side of the boiler of the tubes in adjacent rows.

In order that the invention and the manner of performing the same may be properly understood, there are hereunto appended three sheets of explanatory drawings, through out which like reference letters indicate like parts, and in which Figures 1 and 2, Sheets 1 and 2, are longitudinal vertical sections showing the improvements as applied to two forms of water-tube boilers; Fig. 3, Sheet 3, being a transverse vertical section of another example.

As shown in Fig. 1 of the drawings one pair of upper and lower drums, A, B, are used, the furnace, C, being arranged at one end of the lower drum, B. In Fig. 2, two pairs of such upper and lower drums, A, B, are shown, the furnace, C, being, in this case, arranged at one side of the lower pair of drums, B; or, as shown in Fig. 3, one upper drum, A, and two lower drums, B, are employed, the lower drums being so placed that the furnace (not shown) may be arranged in the space between the lower drums.

Baffle plates, D, are employed, as usual, to cause the products of combustion leaving the furnace, C, to take any desired course in their passage to an exit flue, E.

The opposing surfaces of the upper and lower drums, A, B, in each of the examples hereinbefore described, have formed in them rows of separate circular landings, G. Openings are formed in each of these landings to receive the end of one connecting water tube, H, these landings being at right angles to the axis of the tubes and being formed by pressing outward or inward the surface of the drum, or by pressing it partly inward and partly outward. The depth of the landings, G, is greater for the outer tubes of each row, decreasing as the landings approach the center, the two central tubes in each row practically not requiring any landing. A space at least equal to the diameter of the tubes, H, is left between each transverse row so as to permit of the easy insertion or withdrawal of a tube in any row when necessary without disturbing the other tubes. By providing a separate landing for each tube and leaving a space between each transverse row it is possible to dispense with the necessity of forming corrugations in the drum to permit of the insertion or withdrawal from the side of the boiler of the tubes in adjacent rows.

What we claim is:—

1. In a water tube boiler, a plain drum having separate tube landings formed therein, in parallel rows, and so arranged as to leave sufficient space between the adjacent transverse rows for the insertion or withdrawal of the tubes from either side of a row without the use of manholes, as described.

2. In a water tube boiler, a plain drum having parallel rows of separate circular tube landings formed partially above and partially below the drum face, and so arranged as to leave sufficient space between the adjacent transverse rows for the insertion or withdrawal of the tubes from either side of a row without the use of manholes, as described.

In testimony whereof we have signed our names to this specification, in the presence of the two subscribing witnesses.

ROBERT SINCLAIR,
ALEXR. SINCLAIR,
GEORGE SINCLAIR,
JAMES C. SINCLAIR,
WILLIAM SINCLAIR,
*Trustees and executors of George Sinclair, deceased.*

Witnesses:
　WILLIAM ARMSTRONG,
　ROBERT ALEXANDER LAMBERT.